US012123253B2

(12) United States Patent
Ortega et al.

(10) Patent No.: US 12,123,253 B2
(45) Date of Patent: Oct. 22, 2024

(54) CONFIGURABLE DOOR SYSTEM WITH PLURAL PANELS

(71) Applicant: JELD-WEN, Inc., Charlotte, NC (US)

(72) Inventors: Andres Ortega, Charlotte, NC (US); Pramod Kumar, Peachtree City, GA (US); Garrick Beat, Klamath Falls, OR (US); Jacob Chan, Medford, OR (US)

(73) Assignee: JELD-WEN, Inc.

( * ) Notice: Subject to any disclaimer, the term of this patent is extended or adjusted under 35 U.S.C. 154(b) by 0 days.

(21) Appl. No.: 18/050,257

(22) Filed: Oct. 27, 2022

(65) Prior Publication Data

US 2024/0141717 A1 May 2, 2024

(51) Int. Cl.
*E06B 3/36* (2006.01)
*E06B 3/72* (2006.01)

(52) U.S. Cl.
CPC ................ *E06B 3/72* (2013.01); *E06B 3/365* (2013.01)

(58) Field of Classification Search
CPC ................................. E06B 3/362; E06B 3/365
See application file for complete search history.

(56) References Cited

U.S. PATENT DOCUMENTS

| | | | | |
|---|---|---|---|---|
| 5,832,670 A * | 11/1998 | Bennett | E05D 7/02 49/504 |
| 9,556,665 B2 * | 1/2017 | Ritzert | E06B 3/10 |
| 10,480,240 B2 * | 11/2019 | Toll | E06B 3/36 |
| 10,975,611 B2 * | 4/2021 | Kendall | E05C 7/045 |
| 10,988,967 B2 | 4/2021 | Toll et al. | |
| 11,585,122 B2 * | 2/2023 | Meyer | E05C 7/045 |
| 2008/0178553 A1 * | 7/2008 | Micho | E06B 1/06 52/656.4 |
| 2019/0203521 A1 * | 7/2019 | Massey | E05C 9/04 |
| 2021/0115725 A1 * | 4/2021 | Nelson | E06B 3/30 |
| 2022/0090439 A1 * | 3/2022 | Baca | E05B 65/0071 |

OTHER PUBLICATIONS

Jeld-Wen Windows & Doors. Aurora Exterior Doors. IWP Aurora Custom Fiberglass, Exterior Doors Catalog, Reprinted Jun. 2019.
Bedgebury & Kinsley Folding Sliding Patio Doorset Fitting and Fixing Guide; Product Guide; Apr. 2019; www.jeld-wen.co.uk.
Bedgebury & Kinsley Folding Sliding Patio Doorset Fitting and Fixing Guide; Instruction manual; Apr. 2019; www.jeld-wen.co.uk.
Oakfold & Wellington Folding Sliding Patio Fitting and Fixing Guidelines; Product Guide; Aug. 2009; www.jeld-wen.co.uk.
Oakfold & Wellington Folding Sliding Patio Fitting and Fixing Guidelines; Instruction manual; Aug. 2009; www.jeld-wen.co.uk.

* cited by examiner

*Primary Examiner* — Janet M Wilkens
*Assistant Examiner* — Susan M. Heschel
(74) *Attorney, Agent, or Firm* — Lorenz & Kopf LLP

(57) ABSTRACT

A configurable door system includes a first and second door panel, an astragal, and a frame. The frame defines a first axis and is configured to pivotally support the door panels in a first configuration of the door system and in a second configuration of the door system. The first door panel is disposed to one side of the second door panel along the first axis within the frame in both the first and second configurations. The door system, in the first configuration, includes the astragal fixed to the first door panel and releasably attaches the first door panel to the frame, and the second door panel is releasably secured to the astragal. The door system, in the second configuration, includes the astragal fixed to the second door panel and releasably attaches the second door panel to the frame, and the first door panel is releasably secured to the astragal.

16 Claims, 6 Drawing Sheets

CONFIGURABLE DOOR SYSTEM WITH PLURAL PANELS

TECHNICAL FIELD

The present disclosure generally relates to a door system and, more particularly, relates to a configurable door system with plural panels.

BACKGROUND

Door systems may include a plurality (e.g., two) panels that are supported within a door frame. In many cases, there may be a first door panel disposed on a left side of the frame and a second door panel disposed on a right side of the frame.

However, these door systems typically have only one configuration. Thus, these conventional door systems may have limited utility. Also, these door systems are typically packaged and shipped with the door panels supported within the assembled frame. As such, the door system may be bulky and inconvenient to ship, store, transport, etc.

Accordingly, it is desirable to provide a multi-panel door system having a plurality of different configurations, wherein a single door system can be installed in a first configuration or, alternatively in a second configuration. It is also desirable to provide a plural-panel door system that is packaged and shipped in a compact, lightweight, easy-to-handle state. Furthermore, it is desirable to provide a plural-panel door assembly that can be assembled conveniently. Other desirable features and characteristics of the present disclosure will become apparent from the subsequent detailed description and the appended claims, taken in conjunction with the accompanying drawings and this background discussion.

BRIEF SUMMARY

In one embodiment, a configurable door system is provided that includes a first door panel, a second door panel, an astragal, and a frame. The frame defines a first axis and is configured to pivotally support the first and second door panels in a first configuration of the door system and in a second configuration of the door system. The first door panel is disposed to one side of the second door panel along the first axis within the frame in both the first and second configurations. The door system, in the first configuration, includes the astragal fixed to the first door panel and releasably attaches the first door panel to the frame, and the second door panel is releasably secured to the astragal. The door system, in the second configuration, includes the astragal fixed to the second door panel and releasably attaches the second door panel to the frame, and the first door panel is releasably secured to the astragal.

In another embodiment, a configurable door system is provided that includes a first door panel, a second door panel, an astragal, and a frame defining a first axis. The frame is configured to pivotally support the first and second door panels in a first configuration of the door system and in a second configuration of the door system. The first door panel is disposed to one side of the second door panel along the first axis within the frame in both the first and second configurations. The door system also includes a shipping package configured to contain the first door panel, the second door panel, the astragal, and the frame in a disassembled state of the door system. The first door panel and the second door panel overlap when in the disassembled state in the shipping package. The door system, in the first configuration, includes the astragal fixed to the first door panel and releasably attaches the first door panel to the frame, and the second door panel is releasably secured to the astragal. The door system, in the second configuration, includes the astragal fixed to the second door panel and releasably attaches the second door panel to the frame, and the first door panel is releasably secured to the astragal.

In an additional embodiment, a method of manufacturing a configurable door system is disclosed. The method includes providing a first door panel, a second door panel, an astragal, and a frame defining a first axis and configured to pivotally support the first and second door panels in a first configuration of the door system and in a second configuration of the door system. The first door panel is disposed to one side of the second door panel along the first axis within the frame in both the first and second configurations. The method also includes packaging, within a shipping package, the first door panel, the second door panel, the astragal, and the frame in a disassembled state of the door system. The first door panel and the second door panel overlap when in the disassembled state in the shipping package. The door system, in the first configuration, includes the astragal fixed to the first door panel and releasably attaches the first door panel to the frame, and the second door panel is releasably secured to the astragal. The door system, in the second configuration, includes the astragal fixed to the second door panel and releasably attaches the second door panel to the frame, and the first door panel is releasably secured to the astragal.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
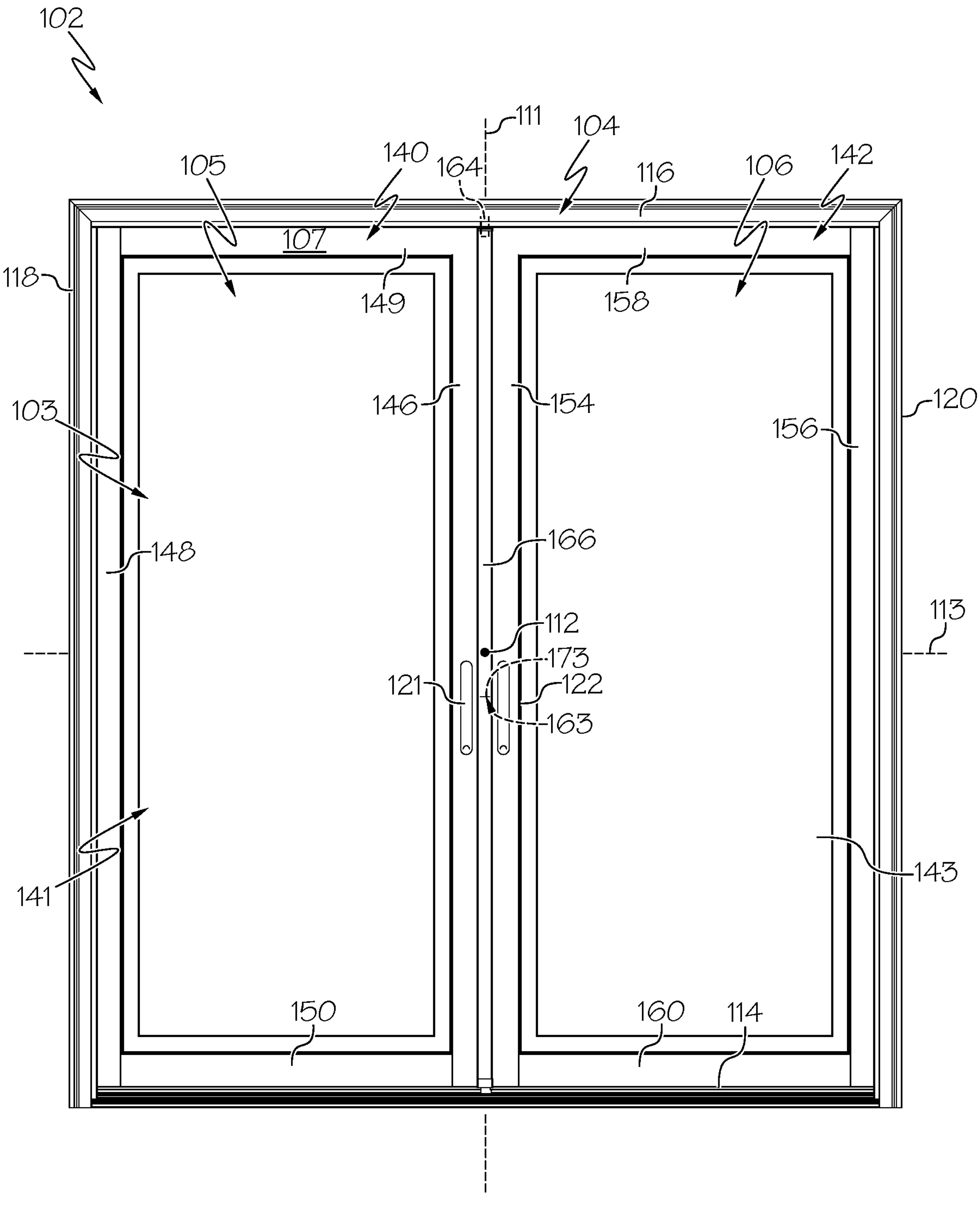
FIG. 1 is a front view of a configurable door system according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a door system with a plurality of door panels and a frame, wherein the door panels may be selectively supported in a plurality of alternative configurations within the frame. For example, the door system may include a first door panel and a second door panel configured to be supported in a frame with the first door panel disposed to one horizontal side of the second door panel in a first configuration and a second configuration. In other words, the first door panel may be disposed horizontally to the left, and the second door panel may be disposed horizontally to the right in the first configuration and the second configuration. Also, the first and second door panels may be hingeably, rotationally, pivotably, or otherwise supported by the frame in the first and second configurations. However, the first and second door panels may be selectively secured differently within the frame, depending on whether the door system is configured in the first or second configuration.

In some embodiments, the door system may include an astragal configured to attach to the first door panel or the second door panel, depending on whether the door system is in the first or second configuration. Accordingly, in some embodiments, the astragal may have features that allow the same astragal to be positioned in the first configuration and the second configuration. In some embodiments, the astragal may include symmetrical features, allowing the astragal to be installed in the first configuration or, alternatively, inverted and installed in the second configuration.

Also, in some embodiments, the door system may include a first retainer system and a second retainer system for securing the panels in a closed position. The first and second retainer systems may be different. For example, the first and second retainer systems may include a respective moveable latch member, bolt, etc. These members may be supported for movement in different directions (e.g., perpendicular directions). In some embodiments, one of the first and second retainer systems may be configured to secure the astragal to the frame, and the other may be configured to secure one of the panels to the astragal. The same retainer systems may be configured either for the first configuration or the second configuration.

In some embodiments, the door system may include the first and second door panels, an astragal, a first latch system, and a second latch system, and a frame defining a first axis and configured to pivotally support the first and second door panels in the first configuration or the second configuration of the door system. The first door panel may be disposed to one side of the second door panel along the first axis within the frame in both the first and second configurations. In the first configuration, the astragal may be fixed to the first door panel and may releasably secure the first door panel to the frame via the first retainer system. Additionally, in the first configuration, the second retainer system may releasably secure the second door panel to the astragal and, thus, to the frame. Alternatively, in the second configuration, the astragal may be fixed to the second door panel and may releasably secure the second door panel to the frame via the first retainer system. Additionally, in the second configuration, the second retainer system may releasably secure the first door panel to the astragal and, thus, to the frame. In these embodiments, the first retainer system may be a shootbolt system, whereas the second retainer system may include a doorknob latch, a deadbolt, or the like.

The door system may also include features that facilitate modularity, reduce parts, reduce packaging, etc. For example, the astragal may include features that allow a singular astragal to be used in either the first configuration or the second configuration. Also, the door system may include retainer systems, latches, strikers, bolts, dummy fixtures, or other features that can be interchangeably used in different positions based on whether the door system is in the first or second configuration.

Additionally, the present disclosure includes door systems that may be packaged and shipped as a kit, which has a plurality of configurations. The configurable door system may be packaged for example, with the first and second door panels at least partly overlapped for reduced packaging dimensions and increased handling convenience. The door system may be packaged with components that are partly assembled, whereas other components are disassembled and stowed compactly. The door system may also include ergonomic features that guide the user in assembling the door system and installing it into a larger structure. Additional advantages will be discussed below.

Figure 2:
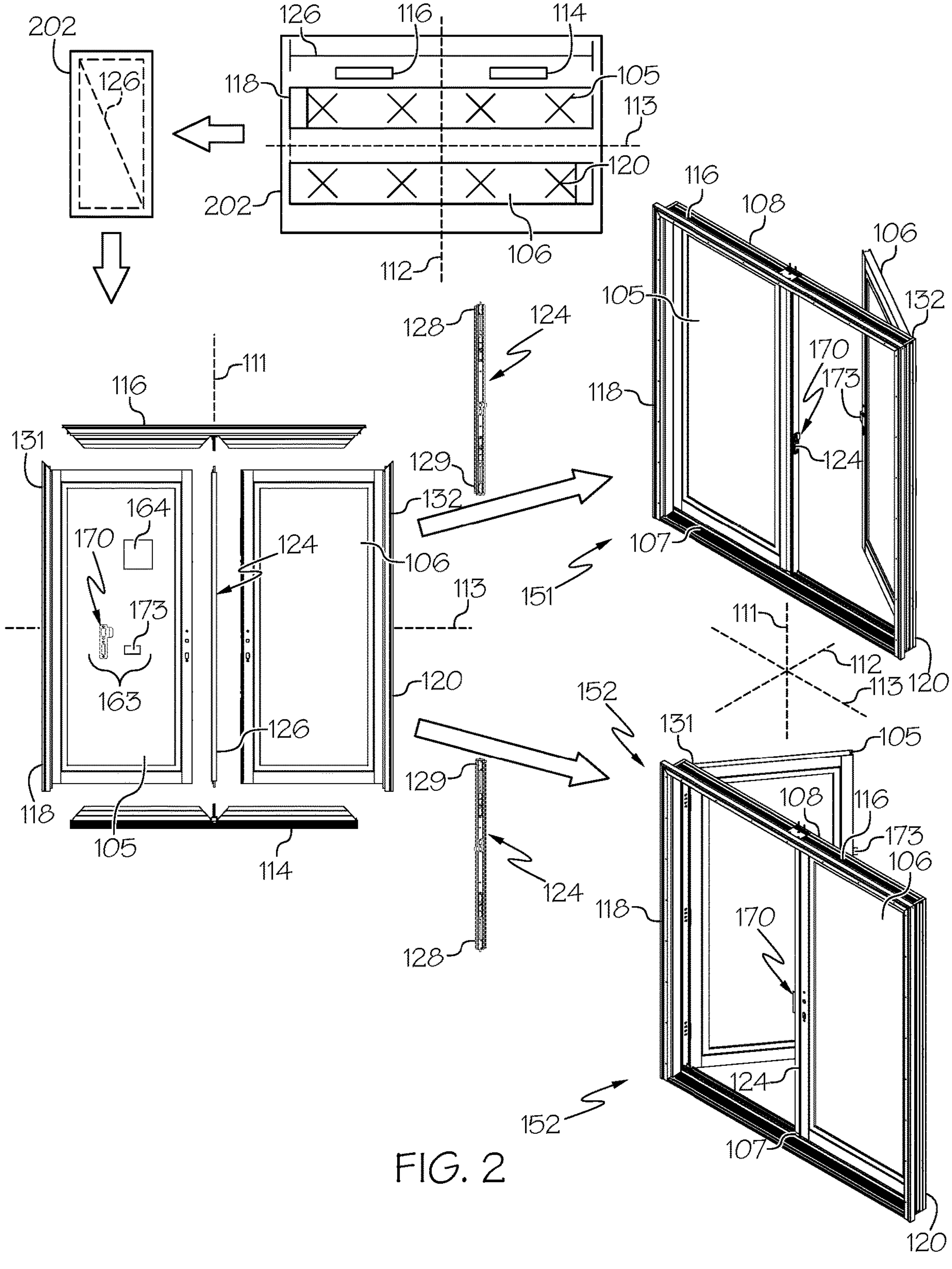
FIG. 2 is a schematic view of the door system of FIG. 1, wherein the door system is shown disassembled and packaged, and wherein the door system is shown assembled in the first configuration and, alternatively, the second configuration according to example embodiments.

Referring now to FIGS. 1 and 2, a fenestration unit 102 is illustrated according to example embodiments of the present disclosure. The fenestration unit 102 may be a door system 103 in some embodiments.

The door system 103 may generally include a rectangular frame 104, a first door panel 105, and a second door panel 106. The frame 104 may define a Cartesian coordinate system with a first axis 111, a second axis 112, and a third axis 113. The first axis 111 may be arranged vertically (along the direction of gravity), and the second and third axes 112, 113 may be disposed in a horizontal plane. The second axis 112 may define ingress/egress directions or inside/outside directions for the door system 103. Thus, the door system 103 may include an exterior side 107 and an interior side 108 facing in opposite directions along the second axis 112. The third axis 113 may be transverse and horizontal relative and may define a left-right direction in some embodiments.

The frame 104 may generally include an elongate footer 114, header 116, a first jamb 118, and a second jamb 120. In some embodiments, the footer 114, the header 116, the first jamb 118, and the second jamb 120 may be unitary and one-piece monolithic parts. The footer 114, header 116, and jambs 118, 120 may be attached end-to-end, for example, by fasteners and/or adhesive, to define a rectangular support for the first and second door panels 105, 106.

Figure 3:
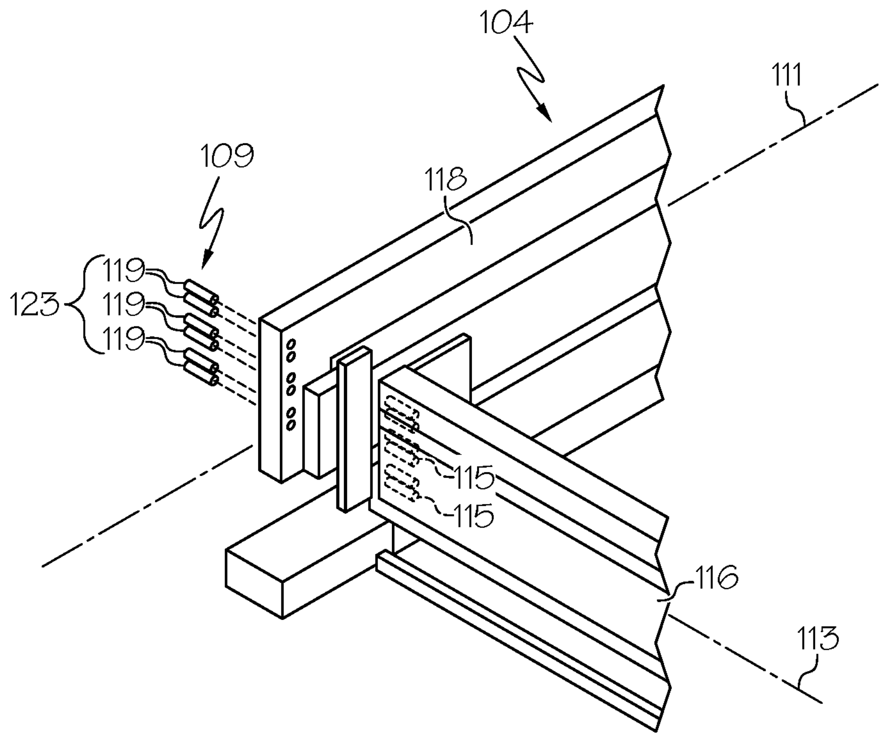
FIG. 3 is an exploded view of a corner joint of a frame of the door system of FIG. 1.

In some embodiments represented in FIG. 3, the frame 104 may be fastened, fixed, engaged, or otherwise attached together by a fastener arrangement 109. As an example, the header 116 and the jamb 118 may be attached by the fastener arrangement 109 at a corner joint 123. The fastener arrangement 109 may include a number of pilot holes 115 extending along the axis 113 into the ends of the header 116. The fastener arrangement 109 may also include a corresponding number of fasteners 119 that extend transversely through the jamb 118 and into the pilot holes 115. Accordingly, the frame 104 may include strong and robust corner joints 123. The fastener arrangement 109 may also provide packaging advantages as will be described.

In some embodiments, the fastener arrangement 109 (e.g., the embodiment of FIG. 3) may be included at both ends (i.e., top and bottom ends) of the jamb 118. Furthermore, the fastener arrangement 109 may, in some embodiments, be included at one or both ends of the second jamb 120.

As shown in FIG. 1, the first panel 105 may include a rectangular first panel frame 140 and a first glazing member 141 supported by the first panel frame 140. The first panel frame 140 may include first stiles 146, 148 and first rails 149, 150, which may be assembled to support the first glazing member 141. The second panel 106 may include a rectangular second panel frame 142 and a second glazing member 143 supported therein. The second panel frame 142 may include second stiles 154, 156 and second rails 158, 160, which may be assembled to support the second glazing member 143.

As shown in FIGS. 1 and 2, the first door panel 105 may be disposed to one side of the second door panel 106 along the third axis 113. The first door panel 105 may be hingeably, pivotably, or otherwise rotationally supported by the first jamb 118 of the frame 104 by one or more first hinges 131. The second door panel 106 may be hingeably, pivotably, or otherwise rotationally supported by the second jamb 120 of the frame 104 by one or more second hinges 132.

In FIG. 1, the first and second door panels 105, 106 are shown respectively in a closed position relative to the frame 104. As shown in FIG. 2, the first and second door panels 105, 106 may be configured to hingeably open toward respective open positions relative to the frame 104. Accordingly, the fenestration unit 102 may be configured as a plural, swinging door system 103. It will be appreciated that the door system 103 may be configured as an exterior door system for a structure in some embodiments. In additional embodiments, the door system 103 may be configured as an interior door system. Features of the present disclosure may be included for a window system in some embodiments.

As shown in FIG. 2, the door system 103 may be configurable in at least two different configurations. In a first configuration indicated at 151, the first panel 105 may remain closed and secured to the frame 104 while the second panel 106 opens and closes. In this first configuration 151 the second panel 106 may secure to the first panel 105, which is secured to the frame 104 (i.e., the second panel 106 may be closed and secured to the frame 104 via the closed first panel 105).

In a second configuration indicated at 152, the second panel 106 may remain closed and secured to the frame 104 while the first panel 105 opens and closes. In this second configuration 152 the first panel 105 may secure to the second panel 106, which is secured to the frame 104 (i.e., the first panel 105 may be closed and secured to the frame 104 via the closed second panel 106).

In other words, in the first configuration 151, the second panel 106 may be the primary or active panel, and the first panel 105 may be the secondary or supportive panel. In contrast, in the second configuration 152, the first panel 105 may be the primary/active panel, and the second panel 106 may be secondary/supportive panel. As will be discussed, components may be configurable, adjustable, positionable, etc. for use in the first configuration 151 and for use in the second configuration 152. In addition, the door system 103 may include features that make for compact packaging, shipping and handling convenience, portability, etc.

The door system 103 may include latch systems, securement systems, lock systems, or other retainer systems that selectively and mechanically secure door panels 105, 106 in their closed positions. In some embodiments, the door system 103 may include a first retainer system 163 and a second retainer system 164. In some embodiments, the first retainer system 163 may be configured as a deadbolt system, and the second retainer system 164 may be configured as a shootbolt system as will be discussed.

The door system 103 may also include at least one handle or handle member, such as first handle member 121 and a second handle member 122 (FIG. 1). The handle members 121, 122 may have a variety of configurations, shapes, styles, etc. without departing from the scope of the present disclosure. The first and/or second handle member 121, 122 may define and comprise part of the first retainer system 163 in some embodiments. For example, portions of the first and/or second handle member 121, 122 may include a doorknob-mounted lock in some embodiments.

Figure 4:
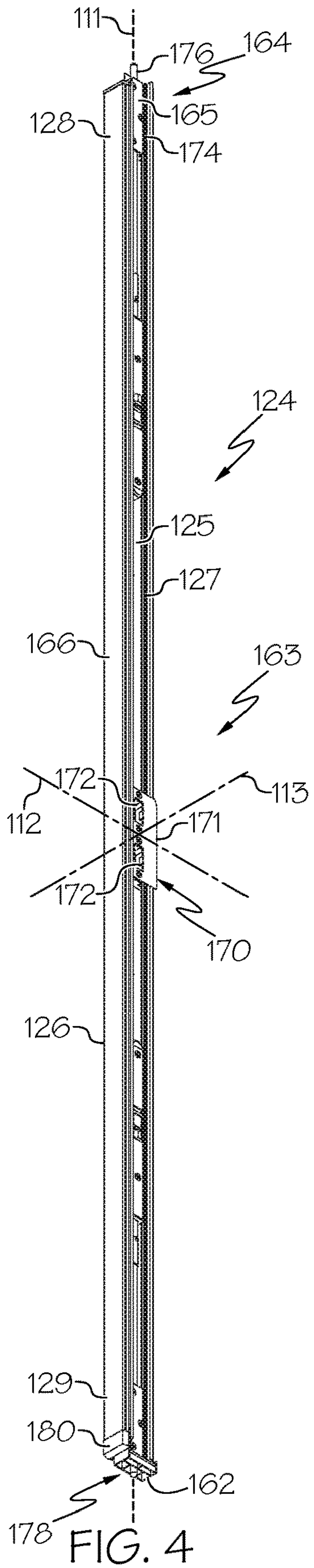
FIG. 4 is a perspective view of an astragal assembly of the door system of FIG. 1.

As shown in FIGS. 1, 2, and 4, the door system 103 may include an astragal assembly 124. The astragal assembly 124 may be configured to support and may comprise at least part of the first and/or second retainer systems 163, 164. The astragal assembly 124 may have different installed positions in the first and second configurations 151, 152.

Figure 5:
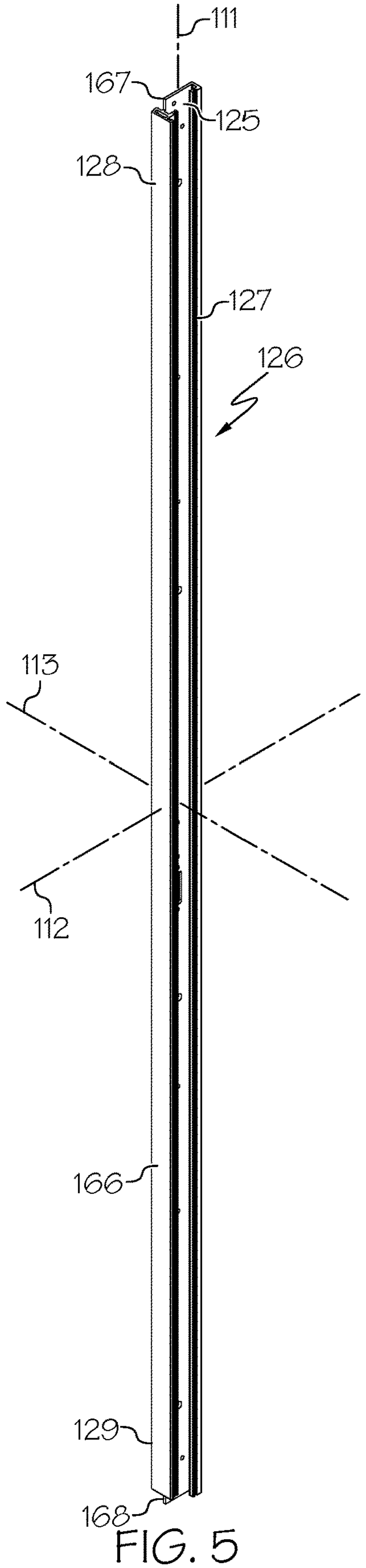
FIG. 5 is a perspective view of the astragal of the astragal assembly of FIG. 4.

As shown in FIGS. 4 and 5, the astragal assembly 124 may include an elongate astragal 126. The astragal 126 may extend longitudinally and straight along the axis 111. The astragal 126 may include a first end 128 and a second end 129 that are separated longitudinally along the axis 111. The astragal 126 may include a spine 127, which may extend between the first and second ends 128, 129, and which may define a longitudinal channel 125 that is open at both the first end 128 and the second end 129. The astragal 126 may include an exterior strip 166. The exterior strip 166 may be flat and may be attached perpendicular to the spine 127, and the strip 166 may extend between the first end 128 and the second end 129. Accordingly, a majority of the longitudinal length of the astragal 126 may have a T-shaped or L-shaped cross section taken perpendicular to the axis 111. However, at both the first and second ends 128, 129, the strip 166 may terminate and the spine 127 may extend outward longitudinally therefrom. Thus, the astragal 126 may include a first notch 167 at the first end 128 and a second notch 168 at the second end 129.

In the first configuration 151 of the door system 103, the spine 127 of the astragal 126 may be fixedly attached to the first door panel 105. The exterior strip 166 may face out from the exterior side 107 of the door system 103. The first end 128 of the astragal 126 may be oriented to point upward along the axis 111 and with the second end 129 pointing downward, as represented in FIGS. 2, 4, and 5.

In the second configuration 152 of the door system, the spine 127 of the astragal 126 may be fixedly attached to the second door panel 106. The exterior strip 166 may face out from the exterior side 107 of the door system 103, with the second end 129 pointing upward along the axis 111, and the first end 128 pointing downward. In other words, the astragal 126 and the astragal assembly 124 may be inverted relative to the position of FIG. 4 (i.e., inverted relative to the axis 113) and attached to the second panel 106. In some embodiments, the astragal 126 and/or the astragal assembly 124 may be substantially symmetrical with respect to the second axis 112 (i.e., symmetrical with respect to axis 113, which is normal to the longitudinal first axis 111).

The notches 167, 168 may provide clearance for the frame 104 when the respective door panel is in the closed position. For example, in the first configuration 151, the notch 167 may provide clearance for the header 116 of the frame 104 when the first panel 105 is in the closed position. In the second configuration 152, the notch 168 may provide clearance for the header 116 of the frame 104 when the second panel 106 is in the closed position.

Figure 6:
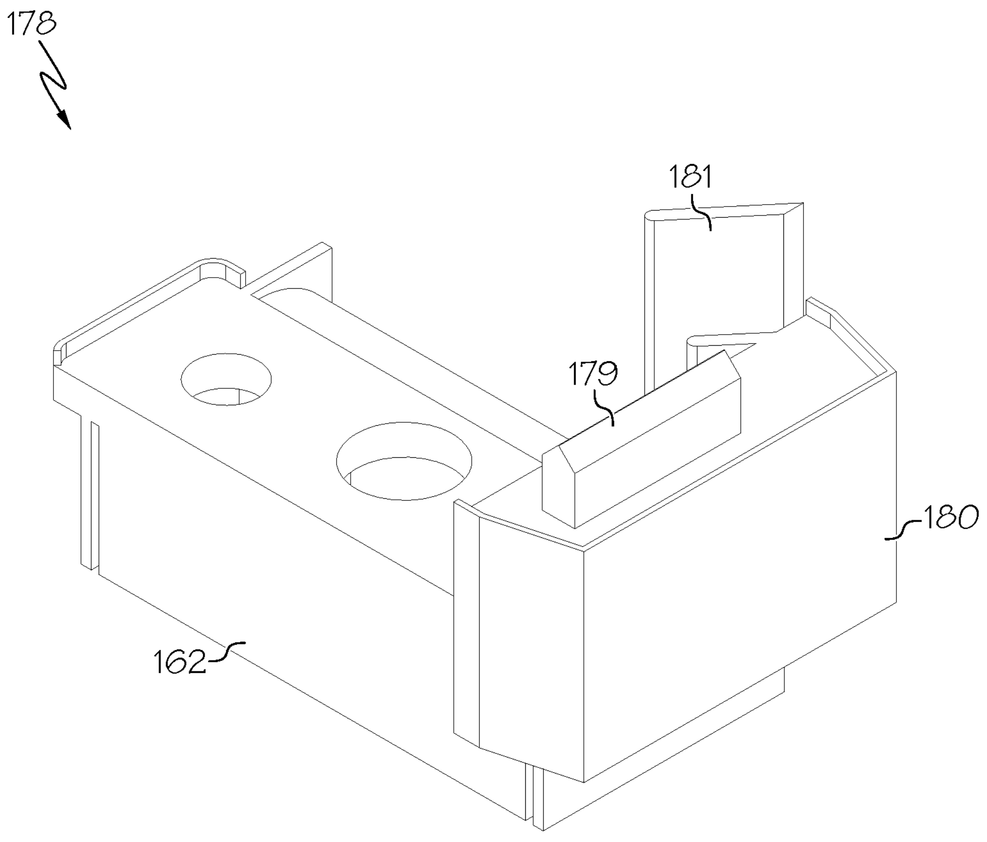
FIG. 6 is a perspective view of an insert member of the astragal assembly of FIG. 4.

The astragal assembly 124 may further include an insert member 178 (FIGS. 4 and 6). The insert member 178 may be configured to be inserted in one end of the astragal 126. For example, the insert member 178 may be inserted and received in one of the notches 167, 168 and may substantially fill the space defined thereby. In some embodiments, the insert member 178 is configured to be installed in the bottom end of the astragal 126 in both the first configuration 151 and the second configuration 152. Thus, the insert member 178 may, in the first configuration 151, be inserted in the notch 168 at the second end 129 of the astragal 126. In the second configuration 152, the insert member 178 may be inserted in the notch 167 at the first end 128.

The insert member 178 may be a block made out of polymeric material in some embodiments. The insert member 178 may include an insertion portion 179, which is shaped to be received in the channel 125 of the astragal 126. The insertion portion 179 may fit into the channel 125 so as to substantially close off and substantially seal off the channel 125 at the bottom end of the astragal assembly 124. The insert member 178 may also include a bottom end portion 162 that fills the notch at the end of the astragal 126. The insert member 178 may also include an exterior face extension 180, which is arranged so as to be substantially flush with the exterior strip 166 of the astragal 126 (FIG. 4). The insert member 178 may also include a resilient flap-seal 181, which is configured to flex and seal against the opposing door panel 105, 106 as it swings closed.

The astragal assembly 124 may also support components of the first and/or second retainer systems 163, 164. In some embodiments, the first retainer system 163 of the door system 103 may include a striker 170 (FIGS. 2 and 4). The striker 170 may be a flat plate with one or more (e.g., two) bolt openings 172. The striker 170 may also include an inward edge 171. In some embodiments, the striker 170 may be symmetrical about the third axis 113 (i.e., symmetric with respect to an axis that is normal to the longitudinal first axis 111). The striker 170 may be overlaid on and fixed to the spine 127 of the astragal 126 with the inward edge 171 arranged facing away from the exterior strip 166. In other words, the ramp 161 of the striker 160 may face inwardly toward the interior side 108 of the door system 103. Also, the spine 127 of the astragal 126 may include one or more holes that align and correspond to the bolt opening(s) 172 of the striker 170.

The first retainer system 163 may also include a retractable bolt 173 (FIG. 2). The bolt 173 may be mounted in either the first panel 105 or the second panel 106. The bolt 173 may be mounted for sliding movement substantially along the axis 113 to be received in the bolt opening 172 of the striker 170. As shown in FIG. 2, in the first configuration 151, the bolt 173 may be moveably mounted (e.g., slidably mounted) within the second panel 106, and the striker 170 may be fixed on the first panel 105. In contrast, in the second configuration 152, the bolt 173 may be moveably mounted (e.g., slidably mounted) within the first panel 105 to be received in the bolt opening 172 of the striker 170 attached to the second panel 106. The handle assemblies 121, 122 may be configured for selectively actuating the bolt 173 of the first retainer system 163.

The second retainer system 164 may include a shoot bolt 165 (FIG. 4). The shoot bolt 165 may include a support body 174 that is fixed within the channel 125 of the astragal 126. The shoot bolt 165 may also include a shuttle or bolt 176 that is supported for sliding movement by the support body 174 along the axis 111. The bolt 176 may extend out longitudinally along the axis 111 from the astragal 126 to be received within the header 116 of the frame 104 to thereby retain the astragal 126 and the attached panel to the frame 104. The bolt 176 may also be selectively retracted within the support body 174 to detach the astragal 126 and the attached panel from the frame 104.

The door system 103 may be constructed from and/or include a number of materials without departing from the scope of the present disclosure. The door system 103 may be constructed at least partly of metal (e.g., steel, aluminum, etc.) in some embodiments. Also, in some embodiments, the fenestration unit 102 may be constructed at least partly of wood, wood products, composite materials, or other materials.

As shown in FIG. 2, in the first configuration 151, the first retainer system 163 may be arranged and configured for securing the second panel 106 to the astragal 126, the astragal assembly 124 may be attached to the first panel 105, and the second retainer system 164 may be arranged and configured for securing the astragal 126 to the frame 104. In the first configuration 151, the first retainer system 163 may be arranged with the striker 170 fixed to the astragal 126 in the astragal assembly 124. The astragal assembly 124 may be attached to the inner edge of the first panel 105. Also, the retractable bolt 173 of the first retainer system 163 may be supported by the second panel 106. Furthermore, in this first configuration 151 the shoot bolt 165 of the second retainer system 164 may be attached to the first end 128 of the astragal 126. The insert member 178 may be inserted in the second end 129. Accordingly, in the first configuration 151, the shoot bolt 165 may protrude out and into the notch 167 to be received in the header 116 to releasably attach the first panel 105 in the closed position in the frame 104. The shoot bolt 165 may be retracted for opening the first panel 105. However, when the first panel 105 is closed, the second panel 106 may swing open and closed relative to the frame 104, the astragal assembly 124, and the first panel 105. When the second panel 106 is closed, the retractable bolt 173 may be received in the striker 160 of the astragal assembly 124 to releasably secure the second panel 106 to the astragal assembly 124.

In the second configuration 152 (FIG. 2), the first retainer system 163 may be arranged and configured for securing the first panel 105 to the astragal 126, the astragal assembly 124 may be attached to the second panel 106, and the second retainer system 164 may be arranged and configured for securing the astragal 126 to the frame 104. In the second configuration 152, the first retainer system 163 may be arranged with the striker 170 fixed to the astragal 126. Compared to the first configuration 151, the astragal 126 may be inverted with the second end 129 pointed upward. The insert member 178 may be inserted in the first end 128. The astragal assembly 124 may be attached as such to the edge of the second panel 106. Also, the retractable bolt 173 of the first retainer system 163 may be moveably supported by the first panel 105. Furthermore, in this second configuration 152 the shoot bolt 165 of the second retainer system 164 may be attached to the second end 129 of the astragal 126. Accordingly, in the second configuration 152, the shoot bolt 165 may protrude out into the notch 168 to be received in the header 116 and to releasably attach the second panel 106 in the closed position in the frame 104. Also, the first panel 105 may swing open and closed relative to the frame 104 and the second panel 106. When the first panel 105 is closed, the retractable bolt 173 may be received in the striker 160 of the astragal assembly 124 to releasably secure thereto.

As represented in FIG. 2, the door system 103 may be packaged compactly to facilitate shipping and handling. The door system 103 may be manufactured and packaged in a shipping package 202, such as one or more rectangular boxes. Within the package 202, the door system 103 may be disassembled and contained within the package 202. In this state, the first panel 105 may be hingeably attached to the first jamb 118, and the first jamb 118 may be detached from the header 116 and the footer 114. Also, the second panel 106 may be hingeably attached to the second jamb 120, and the second jamb 120 may be detached from the header 116 and the footer 114. The first panel 105 may overlap the second panel 106 along the axis 112 as shown in FIG. 2. Thus, the width of the door system 103 (as measured along the axis 113) may be reduced by approximately half when in the disassembled state for compact packaging. The header 116, the footer 114, the astragal 126, the first and second retainer systems 163, 164, and other components may be packaged and tucked in the shipping package 202. Accordingly, the door system 103 may be packaged compactly for more convenient shipping and handling. In some embodiments, there may be individual boxes containing the first panel 105 and the second panel 106, and the individual boxes may be overlapped and bound together to define the shipping package 202.

The consumer may decide whether to assemble the door system 103 in the first configuration 151 or the second configuration 152. Once shipped, the door system 103 may be unpacked from the package 202. The frame 104 may be assembled, for example, using the pilot holes 115 and fasteners 119 at the corner joints 123 (FIG. 3). If the first configuration 151 is needed, the astragal assembly 124 may be assembled as discussed above and attached to the first panel 105. Alternatively, if the second configuration 152 is needed, the astragal assembly 124 may be inverted and attached to the second panel 106. The latch/bolt of the first retainer system 163 may be mounted in the second door panel 106 (in the first configuration) or the first door panel 105 (in the second configuration). Accordingly, the door system 103 can be assembled in both configurations conveniently and quickly.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

We claim:

1. A configurable door system comprising:

a first door panel;

a second door panel;

an astragal that is elongate and that extends along a longitudinal axis, the astragal being symmetric with respect to a transverse axis that is normal to the longitudinal axis;

a frame defining a first axis and configured to pivotally support the first and second door panels in a first configuration of the door system and in a second configuration of the door system, the first door panel disposed to one side of the second door panel along the first axis within the frame in both the first and second configurations, the astragal in the first configuration being inverted relative to the astragal in the second configuration;

the door system, in the first configuration, including the astragal fixed to the first door panel and releasably attaching the first door panel to the frame, the second door panel releasably secured to the astragal;

the door system, in the second configuration, including the astragal fixed to the second door panel and releasably attaching the second door panel to the frame, the first door panel releasably secured to the astragal; and the astragal including a first end and a second end that are separated along the longitudinal axis, the first end and the second end respectively including a notch configured to receive the frame.

2. The door system of claim 1, wherein the astragal in the first configuration is inverted relative to a horizontal plane in the second configuration.

3. The door system of claim 1, wherein the frame includes a header and a sill;

wherein in the first configuration, the notch at the first end is configured to receive the header and the second end is configured to be directed toward the sill; and wherein in the second configuration, the notch at the second end is configured to receive the header and the first end is configured to be directed toward the sill.

4. The door system of claim 3, further comprising an insert;

wherein in the first configuration, the insert is received in the notch at the second end; and wherein in the second configuration, the insert is received in the notch at the first end.

5. The door system of claim 1, further comprising a first retainer system and a second retainer system;

the first retainer system, in the first configuration, configured to releasably secure the second door panel to the astragal;

the second retainer system, in the first configuration, configured to releasably secure the astragal to the frame;

the first retainer system, in the second configuration, configured to releasably secure the first door panel to the astragal; and the second retainer system, in the second configuration, configured to releasably secure the astragal to the frame.

6. The door system of claim 5, wherein the first retainer system includes a striker configured to be supported by the astragal.

7. The door system of claim 6, wherein the striker includes a first end and a second end that are separated along a longitudinal axis thereof; and wherein the striker is symmetric with respect to a transverse axis that is normal to the longitudinal axis.

8. The door system of claim 1, further comprising a shipping package configured to contain the first door panel, the second door panel, the astragal, and the frame in a disassembled state.

9. The door system of claim 8, wherein the frame includes a header, a sill, a first jamb, and a second jamb; and wherein, in the disassembled state, the header and the sill are disassembled from the first jamb and the second jamb, the first door panel is hingeably attached to the first jamb, and the second door panel is hingeably attached to the second jamb.

10. A method of manufacturing a configurable door system comprising:

providing a first door panel, a second door panel, an astragal, and a frame defining a first axis and configured to pivotally support the first and second door panels in a first configuration of the door system and in a second configuration of the door system, the first door panel disposed to one side of the second door panel along the first axis within the frame in both the first and second configurations, the astragal being elongate and extending along a longitudinal axis, the astragal being symmetric with respect to a transverse axis that is normal to the longitudinal axis, a first notch included on a first end of the astragal and a second notch included on a second end of the astragal;

packaging, within a shipping package, the first door panel, the second door panel, the astragal, and the frame in a disassembled state of the door system, the first door panel and the second door panel overlapping when in the disassembled state in the shipping package;

the door system, in the first configuration, including the astragal fixed to the first door panel and releasably attaching the first door panel to the frame, the first notch configured to receive the frame, and the second door panel releasably secured to the astragal; and the door system, in the second configuration, including the astragal fixed to the second door panel and releasably attaching the second door panel to the frame, the second notch configured to receive the frame, and the first door panel releasably secured to the astragal.

11. The method of claim 10, wherein the frame includes a header, a sill, a first jamb, and a second jamb;

wherein, in the disassembled state, the header and the sill are disassembled from the first jamb and the second jamb, the first door panel is hingeably attached to the first jamb, and the second door panel is hingeably attached to the second jamb.

12. The method of claim 11, wherein a pair comprising one of the header and the sill and one of the first jamb and the second jamb are configured to attach at a corner joint, the corner joint including a plurality of fasteners that are received in corresponding pilot holes, the plurality of fasteners extending through one of the pair and the pilot holes included in the other of the pair.

13. The method of claim 10, further comprising providing an insert in the shipping package, the insert configured to be received in the second notch in the first configuration, and the insert configured to be received in the first notch in the second configuration.

14. A configurable door system comprising:

a first door panel;

a second door panel;

an astragal;

a frame defining a first axis and configured to pivotally support the first and second door panels in a first configuration of the door system and in a second configuration of the door system, the first door panel disposed to one side of the second door panel along the first axis within the frame in both the first and second configurations;

the door system, in the first configuration, including the astragal fixed to the first door panel and releasably attaching the first door panel to the frame, the second door panel releasably secured to the astragal;

the door system, in the second configuration, including the astragal fixed to the second door panel and releasably attaching the second door panel to the frame, the first door panel releasably secured to the astragal; and the astragal including a first end and a second end that are separated along the longitudinal axis, the first end and the second end respectively including a notch configured to receive the frame.

15. The door system of claim 14, wherein the frame includes a header and a sill;

wherein in the first configuration, the notch at the first end is configured to receive the header and the second end is configured to be directed toward the sill; and wherein in the second configuration, the notch at the second end is configured to receive the header and the first end is configured to be directed toward the sill.

16. The door system of claim 15, further comprising an insert;

wherein in the first configuration, the insert is received in the notch at the second end; and wherein in the second configuration, the insert is received in the notch at the first end.

* * * * *